United States Patent
Graeber

(10) Patent No.: US 8,027,872 B2
(45) Date of Patent: Sep. 27, 2011

(54) PASSENGER TRANSPORTATION SYSTEM AND METHOD FOR OBTAINING TICKETS IN SUCH A SYSTEM

(75) Inventor: Frank Graeber, Seester (DE)

(73) Assignee: NXP B.V., Eindhoven (NL)

( * ) Notice: Subject to any disclaimer, the term of this patent is extended or adjusted under 35 U.S.C. 154(b) by 62 days.

(21) Appl. No.: 11/573,191

(22) PCT Filed: Aug. 2, 2005

(86) PCT No.: PCT/IB2005/052582
§ 371 (c)(1),
(2), (4) Date: Feb. 5, 2008

(87) PCT Pub. No.: WO2006/016323
PCT Pub. Date: Feb. 16, 2006

(65) Prior Publication Data
US 2008/0215380 A1    Sep. 4, 2008

(30) Foreign Application Priority Data
Aug. 4, 2004  (EP) .................................... 04103752

(51) Int. Cl.
*G07B 15/00* (2011.01)
*G07B 15/02* (2011.01)
*G06F 17/00* (2006.01)
(52) U.S. Cl. ........................ 705/13; 705/417; 235/384
(58) Field of Classification Search ................ 705/5, 13, 705/417; 235/384
See application file for complete search history.

(56) References Cited

U.S. PATENT DOCUMENTS

| | | | | |
|---|---|---|---|---|
| 4,804,825 A * | 2/1989 | Bitoh | ............................. | 235/380 |
| 4,977,501 A * | 12/1990 | Lefevre | ............................. | 705/13 |
| 6,398,110 B1 * | 6/2002 | Kikuchi | ......................... | 235/384 |
| 6,450,404 B1 * | 9/2002 | Imazuka | ......................... | 235/381 |

(Continued)

FOREIGN PATENT DOCUMENTS

EP    1187072 A2 *  3/2002

(Continued)

OTHER PUBLICATIONS

Japan-guide.com (accessed Jun. 18, 2004, available at: http://web.archive.org/web/20040618100418/http://www.japan-guide.com/e/e2359_001.html).*

*Primary Examiner* — John W Hayes
*Assistant Examiner* — Kevin Flynn

(57) ABSTRACT

A method for obtaining tickets for journeys in a passenger transportation system (VSY) which comprises stations (S11 ... S00) for entering and/or leaving transport means (VM1, VM2) of the system (VSY) for journeys between the stations (S11 ... S00), wherein at least one station (S11 ... S00) of the system (VSY) is assigned at least one contactlessly readable data carrier (T11 ... T00) and/or at least one transport means (VM 1, VM2) of the system (VSY) is assigned at least one contactlessly readable data carrier (T10, T20), wherein the contactlessly readable data carriers (T11 ... T00; T10, T20) contain ticket information items (IN11, IN23, IN00), and one of the contactlessly readable data carriers (T11 ... T00; T10, T20) is read by a mobile reader (MOD) in at least one station (S11 ... S00) and/or in at least one transport means (VM1, VM2), and the corresponding ticket information item or items (IN11, IN23, IN00) is/are stored in the mobile reader (MOD).

17 Claims, 2 Drawing Sheets

U.S. PATENT DOCUMENTS

| | | | |
|---|---|---|---|
| 6,505,780 B1 * | 1/2003 | Yassin et al. | 235/492 |
| 6,704,608 B1 * | 3/2004 | Azuma | 700/66 |
| 6,705,531 B1 * | 3/2004 | Norton | 235/492 |
| 2002/0053735 A1 * | 5/2002 | Neuhaus et al. | 257/728 |
| 2002/0118099 A1 * | 8/2002 | Oda et al. | 340/10.52 |
| 2002/0140553 A1 * | 10/2002 | Bachtiger et al. | 340/539 |
| 2003/0120745 A1 | 6/2003 | Katagishi et al. | |
| 2004/0116074 A1 * | 6/2004 | Fujii et al. | 455/41.2 |
| 2004/0180637 A1 * | 9/2004 | Nagai et al. | 455/127.1 |
| 2005/0076020 A1 * | 4/2005 | Huntley et al. | 707/3 |

FOREIGN PATENT DOCUMENTS

| | | |
|---|---|---|
| FR | 1187072 A | 3/2002 |
| FR | 2820597 A | 8/2002 |
| JP | 2000-020767 A | 1/2000 |
| JP | 2001-307032 A | 11/2001 |
| JP | 2002-083325 A | 3/2002 |
| JP | 2003-044888 A | 2/2003 |
| JP | 2003-198451 A | 7/2003 |
| WO | 02/073546 A2 | 9/2002 |
| WO | WO02073546 A | 9/2002 |

* cited by examiner

PASSENGER TRANSPORTATION SYSTEM AND METHOD FOR OBTAINING TICKETS IN SUCH A SYSTEM

FIELD OF THE INVENTION

The invention relates to a method for obtaining tickets for journeys in a passenger transportation system which comprises stations for entering and/or leaving transport means of the system for journeys between the stations.

The invention furthermore relates to a passenger transportation system of the abovementioned type and to a calculation server, a mobile reader and a timetable for carrying out the method according to the invention.

BACKGROUND OF THE INVENTION

There are many fields of application of contactlessly readable data carriers, such as so-called contactless chip cards for example. By way of example, access control to buildings by means of such contactlessly readable data carriers is known. In this case, an access-authorized user has a company badge comprising such a data carrier, wherein the data carrier contains a multi-digit, unique serial number. The data carrier is read by a reader installed in the building and checked with regard to its validity, and if it is valid a door, a turnstile, etc. for entering the building is opened by a control unit.

Ticket systems, for example for access control in football stadiums, operate in a similar manner. To this end, installed in the entry area of a stadium are readers which read corresponding entry tickets provided with a contactlessly readable data carrier and where appropriate may allow access (once again via turnstiles for example).

The use of contactlessly readable data carriers as ski passes is also comparable. A user has a corresponding pass and the contactlessly readable data carrier is valid for example for a certain number of journeys using a ski lift or for a certain length of time, for example one week. In the entry area to the ski lifts there are readers which contactlessly read the ski passes and, if they are valid, allow access to the ski lift.

Considerable market potential for the use of contactlessly readable data carriers is currently provided in the field of (local) public passenger transportation. The known paper tickets can in this case be replaced by a modern electronic fare management system, and this provides advantages both for the operator of the passenger transportation system and also for the users.

Specifically, a user (passenger) in the known passenger transportation system has an electronic ticket on a contactlessly readable data carrier, for example on a passive secure memory chip (FeliCa™ or MIFARE® card according to ISO14443A) or on a smart card chip. Active readers are used to check the validity of the tickets and possibly to debit a fare in the case of tickets which can be loaded with credit. Communication between the reader and the passive readable data carriers is usually based on communication protocols ISO7816 and/or 14443.

For the operator of such a passenger transportation system, it is advantageous that the manufacture and complicated selling of the paper tickets can be omitted. For the user, it is advantageous that there is no need to obtain paper tickets—in the case of loadable tickets, the corresponding fare is simply debited from the ticket. There is then also no longer any need to know the tariff—something which is often a problem particularly for passengers who are not from the area. Tickets which are valid only for a certain period of time, for example monthly passes, can start on any day of the month.

One disadvantage of these known ticket systems for passenger transportation systems is that a user, who usually does not have a reader, is not able to read the content of his data carrier. The user thus has no simple possibility for discovering the duration of validity of his ticket or for discovering the amount of credit still remaining on the ticket.

Furthermore, it is necessary to install active readers in the stations and/or vehicles of the passenger transportation system, and on the one hand these readers have to be maintained and supplied with power and on the other hand they are considerably more expensive than the passive data carriers of the users.

Accordingly, such known ticket systems are expensive and complicated for the operator both to set up and maintain.

OBJECT AND SUMMARY OF THE INVENTION

It is an object of the invention to provide a method of the type mentioned in the first paragraph and a system of the type mentioned in the second paragraph, in which the abovementioned disadvantages are avoided.

In order to achieve the abovementioned object, a method of the type mentioned above is specified,
- in which at least one station of the system is assigned at least one contactlessly readable data carrier and/or at least one transport means of the system is assigned at least one contactlessly readable data carrier,
- in which the contactlessly readable data carriers contain ticket information items,
- in which one of the contactlessly readable data carriers is read by a mobile reader in at least one station and/or in at least one transport means, and
- in which the corresponding ticket information item or items is/are stored in the mobile reader.

In order to achieve the abovementioned object, a passenger transportation system of the type mentioned above is also specified, in which at least one station of the system and/or at least one transport means is assigned at least one contactlessly readable data carrier which contains at least readable ticket information items.

The object according to the invention is furthermore achieved by a calculation server which is designed to receive ticket information items of the contactlessly readable data carriers which are read by a mobile reader, and to determine fares on the basis of these ticket information items.

Moreover, the object is achieved by a mobile reader comprising:
- means for reading ticket information items which are contained in contactlessly readable data carriers,
- means for storing the corresponding ticket information item or items, and
- means for determining a fare from the ticket information items and/or means for transmitting the stored ticket information items to a remote calculation server which determines a fare.

Finally, to achieve the object according to the invention, a timetable is also specified in which, fixed in a position at which a name of a station or of a transport means appears or at which another symbolic representation of this station or of this transport means is arranged, there is a contactlessly readable data carrier which contains station-specific or transport-means-specific ticket information items which uniquely identify the respective station or the respective transport means.

By virtue of the features according to the invention, the advantage is obtained that the use of expensive and maintenance-intensive readers in the stations can be omitted by assigning inexpensive contactlessly readable data carriers to the stations and/or transport means of the passenger transportation system. The mobile reader for reading the data carriers is located with the user, so that the latter can at any time inform himself about the status of his ticket and/or of his journey.

The user can check into the passenger transportation system by reading a contactlessly readable data carrier in a station or in a transport means, that is to say he purchases a virtual ticket. The user thus obtains a journey authorization in the form of a virtual, electronic ticket. In one simple embodiment, this purchase of a ticket is "charged" at a fixed amount (for example in the value of a daily pass) in that this amount is debited for example from a credit with which the mobile reader is loaded.

It is particularly advantageous if the at least one contactlessly readable data carrier assigned to a station and/or to a transport means contains station-specific or transport-means-specific ticket information items which uniquely identify the respective station or the respective transport means, and the ticket information items read by the mobile reader are used to calculate a fare. By virtue of these measures, a fare for a journey can be determined on the basis of the read ticket information items, that is to say the user will be charged only the costs for journeys actually made and not a fixed amount independent of the journey or journeys. In this case, too, a user in principle purchases a ticket, which can moreover be checked as long as the user is in the passenger transportation system.

In principle, it is primarily of no significance whether a user checks into the system by reading a contactlessly readable data carrier in a station or in a transport means. However, checking in at a station has the advantage that information items as to where exactly a journey has started already exist for the fare calculation. These information items usually do not exist in the event of checking in directly in a transport means, although it is in principle conceivable that the contactlessly readable data carriers are connected to means for determining a position.

One example in this respect would be a GPS receiver (Global Position System) which determines the position of a transport means using satellites or else a GSM module (Global System for Mobile Communication) which determines the position using GSM base stations. Corresponding position information items are in this case consequently transmitted to the contactlessly readable data carriers and can thus be used for the passenger transportation system.

Another possibility for position determination would be the time. Specifically, provided that the transport means travels more or less exactly according to the timetable, the transport means is located at a certain location at a certain point in time. Often, a stop for a transport means is also announced by a loudspeaker announcement. These announcements are switched on either manually by the driver or else automatically when the transport means reaches the next station. This activation may also advantageously be used to transmit a location information item to a contactlessly readable data carrier.

Finally, it is also conceivable to equip a graphic diagram of the transport network, that is to say for example a network map of all the stations traveled through or a conventional timetable showing journey times, with a number of contactlessly readable data carriers. In this case, fixed in a position on the timetable at which the name of a station appears or at which another symbolic representation of this station can be seen, there is a contactlessly readable data carrier which contains the same information as a data carrier at a physically real station or information corresponding thereto. Moreover, it may also contain an information item as to where the timetable is located. This additional information item may then be correspondingly evaluated by a charging server.

Such timetables may be made available at various locations, that is to say for example at a stop itself, in a transport means or at any other location. It is thus possible for the passenger to check in and out regardless of where he actually is. For example, a passenger who has forgotten to check in at a bus stop can then check in on the bus. The passenger can also check out for his destination stop at the same time (this process will be explained in more detail below) so that he does not run the risk of forgetting to check out at his destination. The check-in/check-out operation, which is independent of the actual start/end of the journey in terms of time and location, can be provided and correspondingly regulated within the passenger guidelines of a transport operation.

Said timetables or overview maps may of course also be fixed in the stations. Besides the contactlessly readable data carriers which contain station-specific information items, such a timetable may of course also contain contactlessly readable data carriers which contain the same information as a data carrier in a physically real transport means or information corresponding thereto. Distinguishing which transport means has been used is particularly important if one and the same route can be traveled by transport means which cost different amounts. One example in this respect would be for example an inner-city route which can be traveled either by bus or by subway train. Another example of an inter-regional link would be a route on a sea coast for which either a train or a ship may be used.

In principle, the invention can be implemented even if contactlessly readable data carriers are located in only one or a few stations or in only one or a few transport means. If, however, a user enters the passenger transportation system at a station or a transport means in which there are no data carriers, he cannot benefit from the advantages of the invention since he cannot check into the passenger transportation system, that is to say cannot purchase a "ticket".

Usually, therefore, it is provided, and as mentioned above also advantageous, that one or more contactlessly readable data carriers are located in each station of the passenger transportation system. In addition, it may be even more preferable if contactlessly readable data carriers are also provided in the transport means.

Of course, the invention can also be implemented if data carriers are located exclusively in the transport means, but then it may not be possible to benefit from some advantages of the invention, particularly if the data carriers do not contain a location information item.

Just checking into the passenger transportation system is sufficient for determining a fare. However, it is particularly advantageous if a) in a departure station, a contactlessly readable data carrier assigned to said station is read and the corresponding, first ticket information items are stored in the mobile reader, and b) in an arrival station, a contactlessly readable data carrier assigned to said station is read and the corresponding, second ticket information items are at least buffer-stored in the mobile reader, and c) a fare for the journey is determined from the first and second ticket information items. By virtue of these measures, the advantage is obtained that a considerably more accurate calculation of the fare can be carried out since there are (location) information items regarding where the user has entered and left the passenger transportation system.

If a user checks into the passenger transportation system in a station or a transport means provided with contactlessly readable data carriers but leaves the passenger transportation system at a station without contactlessly readable data carriers, the actual fare cannot be calculated—a unit fare is calculated which is usually higher than the actual fare.

If each station and/or each transport means of the system is assigned at least one contactlessly readable data carrier, the advantage is obtained that these disadvantages can no longer arise since the invention is no longer restricted in spatial terms to certain stations of the passenger transportation system and thus can be used for the entire passenger transportation system.

It has proven to be particularly advantageous if, during a journey, station-specific ticket information items are read from a contactlessly readable data carrier at other stations and/or if transport-means-specific ticket information items are read from a contactlessly readable data carrier in transport means, and these information items are used to determine the fare. As a result, the advantage is obtained that a specific route selection and/or transport means selection during the journey of a user can be taken into account when determining the fare.

In one variant of the invention, the determination of the fare from the ticket information items is carried out in the mobile reader. By virtue of these measures, a fare can be determined in situ for the user in a simple and quick manner.

In a further variant of the invention, the ticket information items at least buffer-stored in the mobile reader are transmitted to a remote calculation server in order to determine the fare. However, these measures make it necessary for ticket information items to be transmitted from the mobile reader correspondingly designed for this to a calculation server. To this end, however, the advantages are obtained that central maintenance of the calculation algorithms and tariff data for calculating fares is possible, that tariff changes can be taken into account immediately, and that the mobile readers can be designed more simply and in this respect no maintenance or updates to the mobile readers are necessary.

It is also advantageous if the ticket information items are stored in a secure memory of the mobile reader. As a result, the advantage is obtained that the ticket information items and also other security-related information items, such as journey authorizations, value units and information regarding passenger authentication, can bee reliably stored in the mobile reader. This is particularly important since these information items could be discovered or copied by criminals and thus "unauthorized people" could gain entry to the system. By way of example, use is made here of a "tamper-resistant" smart card controller. In this way, the system according to the invention becomes resistant to attacks on the hardware via the mobile readers.

It is also advantageous that, if no ticket information items of a contactlessly readable data carrier of an arrival station are available to determine the fare, a fixedly predefined fare is determined. As a result, the advantage is obtained that the user is encouraged also to check out of the passenger transportation system so that a fixed fare, which is usually higher than the actual fare, is not charged for the journey. However, these measures are also provided if for example there is no possibility for the user to check out of the system, for example because there are no contactlessly readable data carriers in a station.

It is furthermore advantageous if, once the fare has been determined, said fare is output on the mobile reader, for example is displayed on a display of the mobile reader and/or if, once a contactlessly readable data carrier in the departure station has been read, the status "checked in" is output on the mobile reader, for example is displayed on a display of the mobile reader. In this way, a user can inform himself about the status of his journey, or about the fare once his journey is complete.

It is also advantageous if the determination of a fare is carried out in the mobile reader or in a remote calculation server only after a predefinable period of time or a certain number of read ticket information items. In this way, a "best fare" fare calculation can be carried out for a user, that is to say a number of journeys can be taken into account in the fare calculation and thus the best price can be determined for the user.

Misuse of the invention can be prevented in a particularly reliable manner if access barriers which are coupled to the contactlessly readable data carriers are provided in the stations, and an access barrier is opened to allow entering or leaving of the station only after a contactlessly readable data carrier has been read. Entering or leaving a station is then possible only if the user previously reads a corresponding contactlessly readable data carrier. Without such access barriers, such as turnstiles, "fare-dodging" cannot be prevented by the system per se; fare-dodgers can then only be discovered by an inspector.

The invention can be implemented in a particularly cost-effective manner, with a very low maintenance requirement and thus low maintenance and operating costs, and thus in a particularly advantageous manner, if passive contactlessly readable data carriers are used in and assigned to the stations and/or transport means.

BRIEF DESCRIPTION OF THE DRAWINGS

The invention will be further described with reference to examples of embodiments shown in the drawings to which, however, the invention is not restricted.

DESCRIPTION OF EMBODIMENTS

Figure 1:
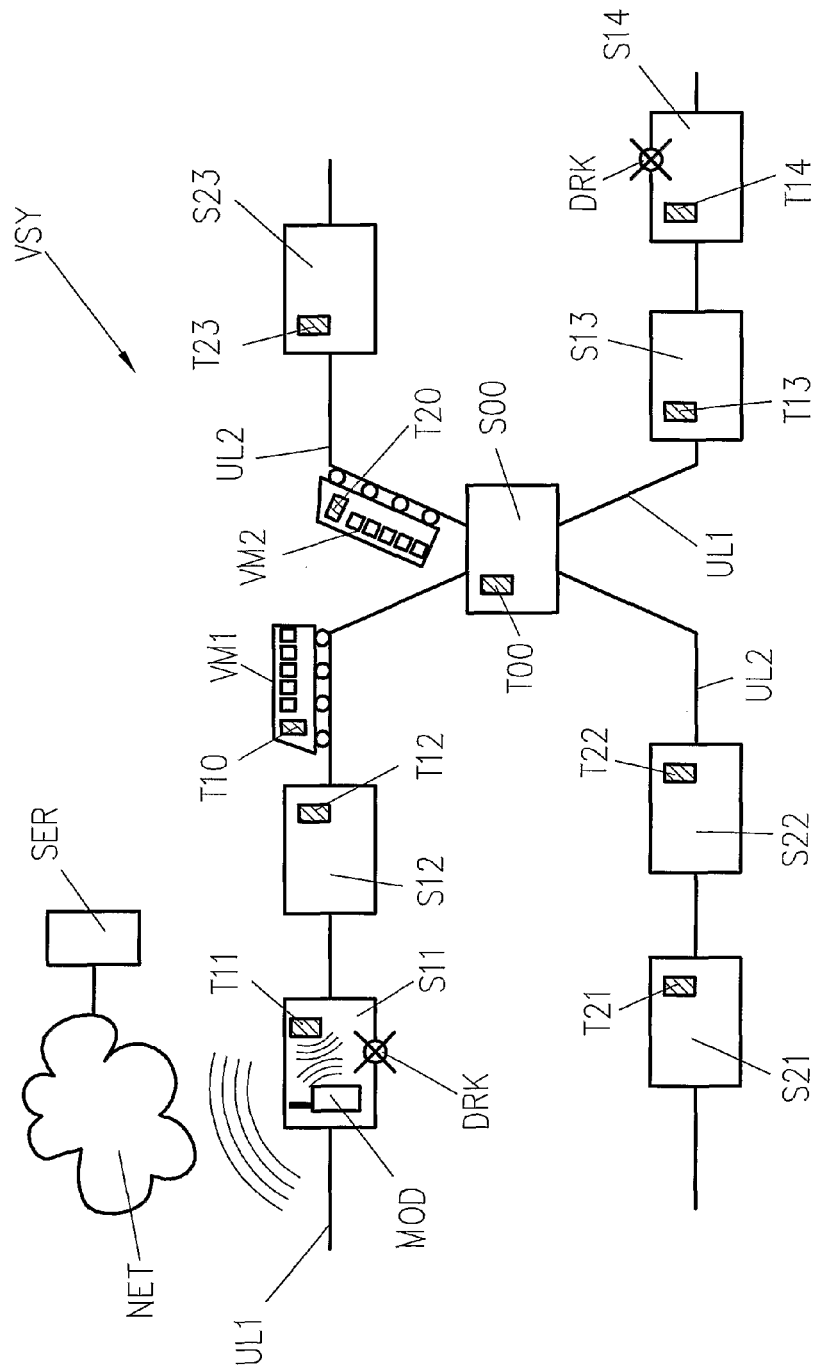
FIG. 1 schematically shows a passenger transportation system according to the invention for a method according to the invention.

FIG. 1 shows a passenger transportation system VSY (hereinafter referred to for short as "system") which comprises by way of example two subway lines UL1, UL2. Transport means VM1, VM2, in this case subway trains, travel on the subway lines UL1, UL2. Of course, such a system VSY may in principle also consist of just one line, or of a number of lines, in particular also different lines (e.g. tram lines, bus lines, high-speed railway lines, ships, etc.).

Furthermore, mention is usually made below of an "operator" of the system VSY, but the invention can also be applied over a number of systems, that is to say with an appropriate contractual agreement or collaboration between the operators of various systems VSY and, if the systems VSY are accordingly technically equipped, a user (passenger) can also use transport means VM1, VM2 of different systems and still benefit from the advantages of the invention.

As can be seen in FIG. 1, the subway line UL1 has a number of stations S11, S12, S13, S14 in which a user can enter or leave a transport means VM1 traveling on this subway line UL1. In a corresponding manner, the subway line UL2 has the stations S21, S22, S23. A common station S00 is also shown, in which it is in principle possible to change between the two subway lines UL1, UL2 and also of course to enter or leave the system VSY. Such changeover stations S00 exist frequently in practice. However, the invention can also be used without any restriction if no such changeover station S00 exists.

Each station S11, S12, S13, S14, S21, S22, S23, S00, "S1 . . . S00" for short, is assigned at least one contactlessly readable data carrier T11, T12, T13, T14, T21, T22; T23, T00, "T11 . . . T00" for short. In principle, it is sufficient if each station S11 . . . S00 is assigned just one such contactlessly readable data carrier T11 . . . T00, and for the purpose of simplification mention will usually also be made below of just one contactlessly readable data carrier T11 . . . T00 in a station S11 . . . S00.

In practice, however, it is advantageous if each station S11 . . . S00 is assigned a relatively large number of such contactlessly readable data carriers T11 . . . T00, since these can then be reached and read more easily for a user and thus the convenience and acceptance of the invention will be considerably increased.

Of course, in this connection, it is also advantageous if the contactlessly readable data carriers T11 . . . T00 are fixed at easily accessible positions and at sites which are often frequented by passengers. It is furthermore advantageous if the data carriers T11 . . . T00 are marked in such a way that they can easily be seen, for example by a corresponding poster, sign, etc. indicating the position of the contactlessly readable data carriers T11 . . . T00 or by the data carriers T11 . . . T00 being directly incorporated into such posters, signs or even timetables, etc.

The data carriers T11 . . . T00 assigned to the stations S11 . . . S00 contain station-specific ticket information items IN11, IN23, IN00 which identify the respective station S11 . . . S00. These unique ticket information items IN11, IN23, IN00 may be for example a unique number, a unique name or other information items, for example geographic information items, which identify the respective station S11 . . . S00 and distinguish them from one another. All the data carriers T11 . . . T00 of a station S11 . . . S00 in this case contain a set of information items which are identical for each data carrier T11 . . . T00 of the station S11 . . . S00 and which allow unique identification of each station S11 . . . S00 within the context of and for the purposes of the invention.

Within the context of the invention, a user has a mobile reader MOD by means of which the ticket information items IN11, IN23, IN00 from a contactlessly readable data carrier T11 . . . T00 can be read and stored. The mobile reader MOD is preferably designed as a mobile telephone or Personal Digital Assistant (PDA). The data carriers T11 . . . T00 are designed as so-called "Radio Frequency Identification" (RFID) tags.

Figure 2:
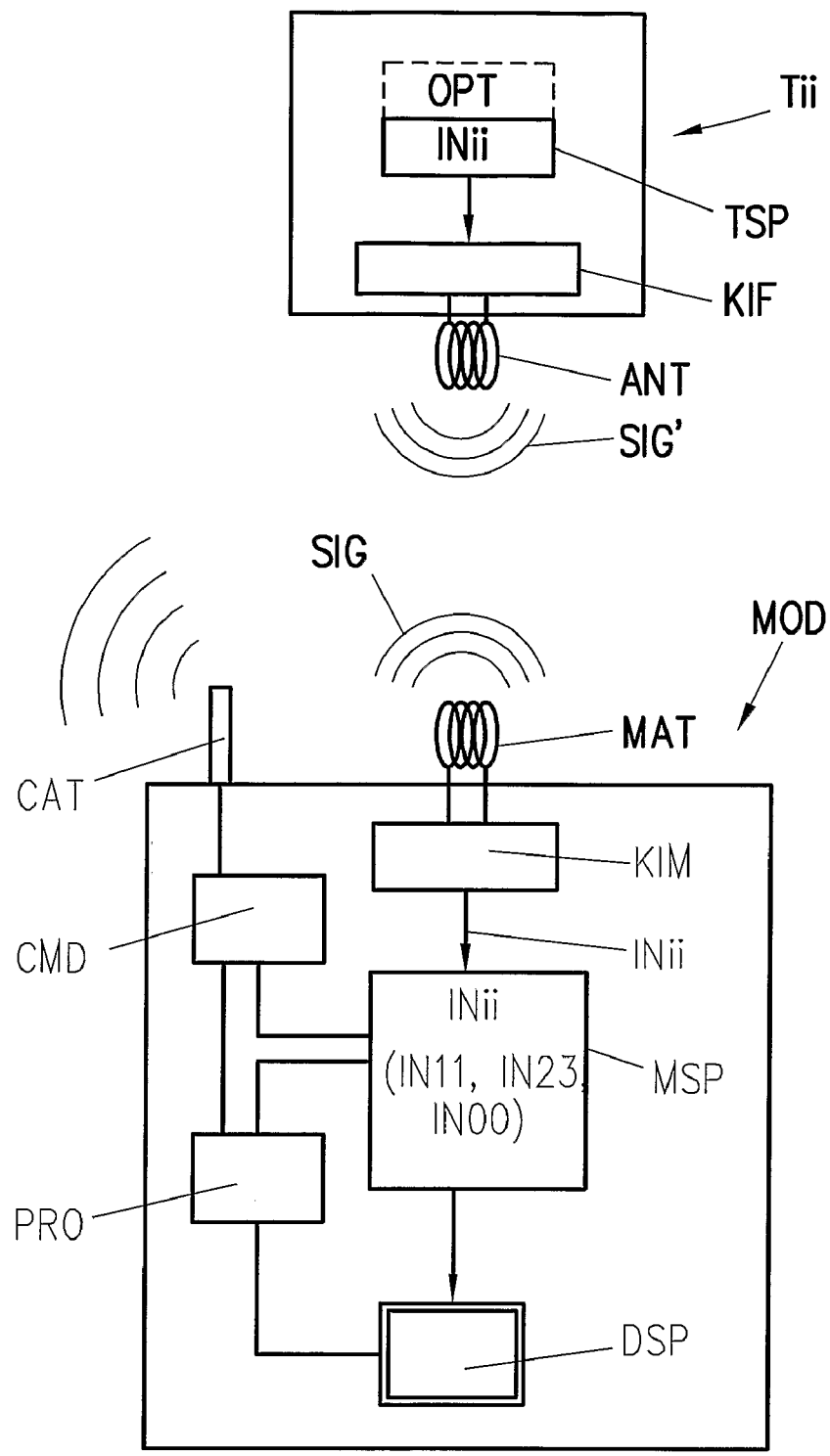
FIG. 2 shows a contactlessly readable data carrier with a corresponding mobile reader.

As shown in FIG. 2, a data carrier Tii designed as an RFID tag comprises a coupling element, for example in the form of an antenna ANT for receiving electromagnetic signals SIG which are transmitted by the mobile reader MOD and for transmitting electromagnetic signals SIG' to the mobile reader MOD, and also a communication interface KIF connected to the antenna ANT, and a data memory TSP. By means of the electromagnetic signals SIG received from the mobile reader MOD, the data carrier Tii can also be supplied with electrical power, for example when the data carrier Tii is a passive data carrier according to standard ISO/IEC-14443 as used in the context of the invention. In this case, the mobile reader MOD transmits an HF carrier signal with a frequency of 13.56 MHz, which carries pulse-width-modulated information. In this embodiment, the range is typically up to 1 m.

In principle, with regard to contactless communication, the invention is not restricted to a specific type of wireless communication technology, that is to say in principle any type of wireless communication may be provided between the mobile reader MOD and a data carrier Tii.

However, in order that a user is not inadvertently checked into the system VSY upon entering a station S11 . . . S00—it may indeed happen that a station S11 . . . S00 is entered without any intention of using a transport means VM1, VM2—it is advantageous if the active range of the mobile readers MOD is limited. Ranges of approx. 1 m are in principle advantageous here. However, it is particularly advantageous if the range is even shorter and is approx. 20 cm or less. With this range, intentional handling by the user, namely the action of bringing the mobile reader MOD into the vicinity of a contactlessly readable data carrier Tii, is necessary in order to check in/out. Inadvertent checking in or checking out can be ruled out with a high probability at these ranges.

For these reasons, it is preferred that the mobile reader MOD and the data carrier Tii are designed as NFC devices (=Near Field Communication Device), for example according to standard ISO 18092 or according to the MIFARE® standard. In NFC devices, the range is typically approx. 20 cm in the active mode and approx. 10 cm in the passive mode, and in devices according to the MIFARE® standard the range is typically approx. 2 cm. In one simple embodiment, the data carrier Tii passes into an active state when it receives sufficient electrical power through the electromagnetic signal SIG, in which active state the communication interface KIF transmits the data stored in the memory TSP, namely station-specific ticket information items INii and optionally additional data OPT, to the mobile reader MOD in a modulated manner as electromagnetic signals SIG'. The optional additional data OPT may comprise further details, background information or other information items. Such optional additional data OPT may be location-related service information items, for example the location of the nearest ticket office of the passenger transportation system VSY, the tariff zone of the station S11 . . . S00, etc.

Transmission may take place either continuously or once upon request, wherein an anti-collision protocol is advantageously used if a number of tags are located in the read range of a mobile reader MOD. In one more efficient embodiment of the data carrier Tii, the communication interface KIF is designed as a "state machine" or microprocessor for implementing communication protocols. Such a communication protocol may stipulate for example that the data carrier Tii transmits information only if it is requested to do so by "broadcast" or inventory commands from the mobile reader MOD. Likewise, the communication protocol may provide that the mobile reader MOD requests the ticket information items INii and the additional data OPT separately from one another from the data carrier Tii.

The data carrier Tii may exist in various embodiments, for example as a chip; however, it may also be incorporated, sometimes in a very small form, in articles such as posters, timetables, etc.

As mentioned, each data carrier Tii transmits the station-specific ticket information items INii of the station Sii assigned thereto (or the transport-means-specific ticket information items of the transport means VM1, VM2 assigned thereto, as explained in more detail below) and optionally the additional data OPT to the mobile reader MOD when the latter arrives in the active range thereof (either automatically or—as is customary—upon request from the mobile reader MOD). The mobile reader MOD receives, via an antenna MAT, the electromagnetic signals SIG' transmitted from the data carrier Tii. The antenna MAT is connected to a communication interface KIM which demodulates the ticket information items INii and where appropriate the additional data OPT from the received electromagnetic signals SIG' and stores the ticket information items INii in a memory MSP.

The memory MSP is advantageously a secure memory. This brings the abovementioned advantages that the system is secured against attacks via the mobile reader MOD. Furthermore, suitable cryptographic protocols for communication of the wirelessly readable data carrier Tii with the mobile reader MOD or with the secure memory MSP moreover ensure that an authenticated data carrier Tii has been read. To this end, for example, each data carrier Tii stores a secret key which is known only to the operator. This secret key is used to authenticate the data carrier Tii with respect to the secure memory MSP integrated in the mobile reader MOD.

If the data carriers Tii are not sufficiently protected against theft, it will be possible for the system VSY to be undermined, as occurs also in traditional systems. However, one further advantage of the invention is that it is nevertheless more cost-effective to protect a simple passive data carrier Tii against theft and vandalism than it is to protect an active reader.

Returning to FIG. 1, we will now consider the journey of a user using subway lines UL1 and UL2, starting in station S11 and ending in station S23. The user changes lines in station S00.

When the user enters the station S11, or before a user enters a transport means of the line UL1, said user must bring his mobile reader MOD into the vicinity of a contactlessly readable data carrier T11 in the station S11 for the purpose of "checking in" or for the virtual purchase of a ticket. As described above with reference to FIG. 2, at least the ticket information items IN11 are transmitted to the mobile reader MOD and stored there in the memory MSP. In addition, it may be displayed on a display DSP (FIG. 2) of the mobile reader MOD inter alia that the user has "checked into" the system VSY—in this way, the user is comprehensively informed about his current status in relation to the system VSY.

The user then travels by means of the transport means (trains) of the subway lines UL1 and UL2 to the arrival station S23, where he once again reads a mobile data carrier T23 provided there with his mobile reader MOD. The corresponding ticket information items IN23 are transmitted to the mobile reader MOD. These ticket information items IN23 are preferably also stored in the memory MSP in order to prevent information losses.

Based on these ticket information items IN11 and IN23, a fare for the route traveled is then determined. It may be provided that the fare is determined directly in the mobile reader MOD by means of corresponding evaluation means PRO. To do this, it is necessary for corresponding evaluation algorithms and tariff information to be stored in the mobile reader MOD, by means of which and on the basis of which algorithms and information the fare is determined. The determined fare is advantageously displayed on the display DSP of the mobile reader MOD. In addition, the status "checked out" may also be displayed.

In one advantageous embodiment of the invention, however, the calculation of the fare does not take place in the mobile reader MOD itself but rather in a remote calculation server SER. For this, the ticket information items IN11, IN23 are transmitted from the mobile reader MOD to this calculation server SER. To this end, the mobile reader MOD has at least one communication module CMD which is usually assigned an antenna CAT. By means of this communication module CMD, the mobile reader MOD, which is in this case preferably designed as a mobile telephone, transmits the ticket information items IN11, IN23 to the calculation server SER, where the determination of the fare is then carried out.

Of course, the mobile reader MOD may also be in this case for example a PDA with a corresponding communication module CMD.

Transmission using the communication module CMD takes place for example, as shown, via a mobile telephone network NET, for example a GSM and/or UMTS network, by means of WAP or GPRS, or in the form of an SMS, MMS, EMS, etc. or for example via a WLAN.

Once the fare has been determined in the calculation server SER, the fare is advantageously transmitted to the mobile reader MOD and displayed there to the user on the display DSP for example. By way of example, the fare may be transmitted in the form of an SMS. Furthermore, the fare is debited from the user for example from an account, or the mobile reader MOD is loaded with a certain value (credit) and the fare is debited from said value.

Both methods given by way of example for charging the fare, that is to say either debiting from an account or debiting from a credit stored in the mobile reader MOD or assigned to the mobile reader MOD, may be used both in the variant of the invention in which the fare is determined in the mobile reader MOD and in the latter variant in which the determination takes place in a remote calculation server SER.

The combination of a mobile reader MOD loaded with a certain value (credit) and the determination of the fare in the mobile reader MOD itself is advantageous since in this case there is absolutely no need to transmit data to a remote calculation server SER or to a debiting system or account.

The determination of the fare in a remote calculation server SER is particularly advantageous if the fare is debited from an account of the user, since in this case the user no longer needs to worry about loading the mobile reader MOD.

The determination of the fare in a remote calculation server SER furthermore has the advantage that the mobile reader MOD need not be designed to determine the fare, as a result of which said mobile reader MOD can be designed much more simply. Moreover, the maintenance and care of data, for example tariff data for determining the fare, can then be carried out in the server SER. Tariff changes can be taken into account immediately, something which is not so easily possible in the event of calculation in the mobile readers MOD and would require an update of a large number of mobile readers MOD.

If a user forgets to check out of the system VSY at the arrival station S23, it may be provided that a predefinable amount is calculated as the fare and is accordingly debited. By way of example, it may be provided that the fare is the cost of a daily pass.

As described above, it is usually provided that the fare is calculated by virtue of ticket information items IN11, IN23 relating to the start and arrival station S11, S23. In principle, it may also be provided that further ticket information items IN00 are also taken into account, for example from a contactlessly readable data carrier T00 of the changeover station S00. In this way, the specific journey route of the user can also be taken into account and included in the tariff calculation. For example, the corresponding ticket information items IN11, IN23, IN00 are jointly transmitted to the calculation server SER as soon as the end point S23 is reached and check-out is complete, or the calculation is carried out in the mobile reader MOD.

In principle, the stations S11 . . . S00 can be entered unhindered and can also be left unhindered. It is thus up to a user of the system VSY whether he wishes to purchase a "ticket" or would rather "fare-dodge". However, it is also known from some cities that access to subway lines is possible only via access barriers DRK, such as turnstiles, gates, etc., which allow the station to be entered and/or left only once a conventional ticket has been correspondingly validated. Such access barriers DRK are shown schematically in FIG. 1 at the stations S11 and S14.

Similarly, in the invention it may be provided that such an access barrier DRK is suitably coupled to contactlessly readable data carriers T11 and T14 and allows access, that is to say opens the access barrier DRK, only if a user checks in beforehand by reading a data carrier T11 and T14. Alternatively or preferably in addition, it is then also possible to leave the station S11 and S14 only if the user checks out once again by reading a corresponding data carrier T11 and T14. In this way, it is rarely possible to use the transport means VM1, VM2 without paying to do so.

The abovementioned procedure for calculating the fare in which intermediate stations S00 are taken into account can advantageously be applied in particular in such systems VSY which allow entering or leaving only once the data carriers T11 . . . T00 have been correspondingly read, since, in the event of a change of transport means VM1, VM2, usually the corresponding data carriers T00 for leaving and entering a new transport means VM1, VM2 have to be read in any case.

As described above, it may be provided that a calculation and possibly debiting of the fare, possibly taking account of intermediate stations, takes place after each journey. However, it may also be provided that firstly a certain number of ticket information items IN11, IN23, IN00 are collected or that ticket information items IN11, IN23, IN00 are collected over a certain period of time, for example one month, that is to say are stored in the secure memory MSP of the mobile reader MOD, and only then does a calculation of the overall fare take place. To this end, the ticket information items IN11, IN23, IN00 are then transmitted to the calculation server SER, where the calculation takes place. In this procedure, a so-called "best fare" calculation may be carried out to the benefit of the user. For example, if the user has traveled a certain number of journeys in a month and the individual fares would exceed the costs of a monthly pass, in such a calculation the more advantageous monthly pass can be calculated for the user.

For the user of a system in which the purchasing of a conventional (paper) ticket and the new debiting according to the invention are possible, this represents a further incentive to move up to the new system which is much more advantageous for the user since he does not need to consider, at the start of a period of time, which type of "ticket" would be the best for him, since in any case the lower price will be calculated for a given period of time.

Furthermore, it may also be provided that a user can automatically check himself out of the system VSY. This may be effected for example by pressing a corresponding button on his mobile reader MOD. This may be done for example during or after reading of a contactlessly readable data carrier T23 in the arrival station S23.

The fare calculation of all the collected (that is to say stored but not debited) ticket information items IN11, IN23, IN00 then takes place directly in the mobile reader MOD, or the ticket information items are transmitted to the calculation server SER and the calculation takes place there.

For control purposes by monitoring staff, e.g. by conductors or inspectors, the mobile reader MOD can be read by such a monitoring person using a suitable mobile reading device, for example an active smart card reader. Following successful authentication with respect to the mobile reader MOD, the monitoring person can read the ticket information items IN11, IN23, IN00 collected thereon. In this way, the monitoring person can ascertain whether the passenger has checked into the system VSY in the proper way, that is to say whether the passenger has read a valid data carrier T11 . . . T00 for the current journey.

For this reason, it may also be advantageous if the time of checking into and/or out of the system VSY is also protocolled. By way of example, a clock installed in the mobile reader MOD may be used to store the time together with a ticket information item IN11, IN23, IN00 for each procedure. It is also conceivable that the time is transmitted to the data carriers T11 . . . T00 and then from there is loaded into the mobile reader MOD. In this case, a read/write device for example, which is fitted to the ceiling and thus is largely protected against vandalism, may transmit the time to a number of data carriers T11 . . . T00, for example every minute. Of course, other variable data can also be transmitted to the data carriers T11 . . . T00 in this way.

The inspector can then connect his mobile reading device securely to the calculation server SER and can then ascertain whether further collected ticket information items IN11, IN23, IN00 have to be transmitted to the server SER. This is important when the mobile reader MOD itself cannot/could not establish an online connection to a remote calculation server SER (whether or not desired by the user). In this case, the collected ticket information items IN11, IN23, IN00 remain for the time being in the memory MSP of the mobile reader MOD. When the passenger is checked by an inspector, the collected ticket information items IN11, IN23, IN00 on the mobile reading device of the inspector will be transmitted via the NFC interface. Based on these ticket information items IN11, IN23, IN00, a fare is then determined for the journey traveled.

It may be provided that the fare is determined directly in the mobile reading device of the inspector, or else these ticket information items IN11, IN23, IN00 are transmitted from the mobile reading device of the inspector to the remote calculation server SER in order to determine the fare.

If collected ticket information items IN11, IN23, IN00 which have not yet been debited are stored on the mobile reader MOD of the user, this transmission path can be used to synchronize the calculation server SER with the mobile device MOD of the passenger. The passenger could otherwise attempt never to establish a connection between his mobile reader MOD and the remote server SER in order to travel for free.

If the debiting correctly takes place on the remote server SER, the mobile reader MOD of the user receives an electronic receipt and the collected ticket information items IN11, IN23, IN00 are marked as "debited" and written into the logbook or logfile of the memory. If debiting takes place locally, for example on the mobile reader MOD itself, the mobile reader MOD of the user must then request and obtain an electronic receipt from an authorized body in order to be able to mark the collected ticket information items IN11, IN23, IN00 as "debited".

FIG. 1 shows the typical case in which at least one contactlessly readable data carrier T11 . . . T00 is located in each station S11 . . . S00 of the system VSY. In this way, an optimal calculation of the fare is possible since usually the start and arrival station of a journey and possibly also intermediate stations are known. If the user forgets to check out, a daily pass can be calculated for him for example. However, this situation can also be taken into account in a "best fare" calculation.

FIG. 1 also shows the possibility that contactlessly readable, preferably passive data carriers T10, T20 are also located in the transport means VM1, VM2. If these data carriers contain transport-means-specific ticket information items, in this way account can additionally be taken of which transport means VM1, VM2 were used during a journey.

The user can also check into the system VSY in a transport means VM1, VM2, wherein the cases must be distinguished in which the data carriers T10, T20 contain only transport-means-specific ticket information items or also station-specific ticket information items. In the first-mentioned case, the starting point of a journey is not known. All that is known is which transport means VM1, VM2 (and possibly which other transport means and/or stop(s) or arrival station(s)) were used. This situation must then be specially taken into account when calculating the fare. However, if the data carriers T10, T20 also contain station-specific ticket information items, the calculation of a fare as described above is possible.

Corresponding data carriers T10, T20 may be incorporated in a route map or timetable which graphically depicts the transport network. Such overview maps are usually located in each transport means VM1, VM2. Fixed in a position at which a name of a station S11 . . . S00 or at which another symbolic representation of this station S11 . . . S00 is arranged, there is a contactlessly readable data carrier T11 . . . T00 which contains station-specific ticket information items IN11, IN23, IN00 which uniquely identify the respective station S11 . . . S00. Checking into and out of the system VSY is therefore possible in a much simpler manner.

It is moreover advantageous if contactlessly readable data carriers T11 . . . T00 are located at least in the stations S11 . . . S00. In principle, however, it would also be possible for data carriers T10, T20 to be located only in the transport means VM1, VM2, and for there to be no data carriers T11 . . . T00 in the stations S11 . . . S00.

It is of course also possible that no data carriers T10, T20 which contain transport-means-specific ticket information items are located in the transport means VM1, VM2. Instead, corresponding data carriers T10, T20 are incorporated in a route map or timetable which graphically shows the individual lines. Such overview maps or timetables showing journey times are usually located in each station S11 . . . S00. Fixed in a position at which a name of a transport means VM1, VM2 appears or at which another symbolic representation of this transport means VM1, VM2 is arranged, there is a contactlessly readable data carrier T10, T20 which contains transport-means-specific ticket information items which uniquely identify the respective transport means VM1, VM2. Of course, it is also possible for there to be on one and the same map or timetable both data carriers T10, T20 which contain transport-means-specific ticket information items and data carriers T11 . . . T00 which contain station-specific ticket information items IN11, IN23, IN00.

The abovementioned example of embodiment describes one particularly advantageous embodiment of the invention in which the contactlessly readable data carriers T11 . . . T00, T10, T20 contain ticket information items which uniquely identify and distinguish from one another the stations S11 . . . S00 and transport means VM1, VM2. This has the advantages mentioned in more detail above.

In principle, however, the invention can also be implemented with contactlessly readable data carriers T11 . . . T00, T10, T20 which contain only identical "ticket information items". In such an embodiment, however, the calculation of a fare is no longer possible; the user merely purchases a journey authorization in the form of a virtual, electronic ticket which can also be checked but has to be debited by a fixed amount (unit price) since no information is available about the course of the journey (route).

Such an embodiment still offers a large number of advantages which have already been described, for example the fact that it is no longer necessary to purchase a paper ticket or that it is easier to set up and maintain than other electronic ticket systems. Compared to the example of embodiment described with reference to the figures, however, there is the disadvantage that a precise calculation of the fare is not possible.

It is therefore particularly advantageous if the invention is implemented as described in the example of embodiment, and wherein the contactlessly readable data carriers T1 . . . T00, T10, T20 also contain identical "ticket information items" in addition to the ticket information items which uniquely identify the stations S11 . . . S00 and transport means VM1, VM2. Upon checking into the system VSY, the user then receives a journey authorization in the form of a virtual, electronic ticket which can also be checked but has to be debited by a fixed amount (unit price). However, if the passenger then additionally collects information items about the actual course of the journey (route), which is possible on the basis of the ticket information items IN11, IN23, IN00 which identify the stations/transport means on the data carriers T11 . . . T00, T0, T20, the user also has the possibility to check out. The fixed amount (unit price) which has already been paid can be taken into account and included in the billing. In this embodiment, an exact calculation of the fare may thus also be possible.

Finally, reference should once again be made to the advantages and differences of the invention compared to the prior art. By virtue of the use of passive wireless data carriers T11 . . . T00 in the stations S11 . . . S00, which are read by a user using a reader MOD, there is no need for active data carriers T11 . . . T00 in the stations S11 . . . S00 which have to be supplied with power and are considerably more expensive. The setup and maintenance and operating costs can thus be reduced. Moreover, no connection of the passive data carriers T11 . . . T00 to a background system e.g. via a fixed line is required, as is the case for example if there are active readers in the stations.

Using his (active) reader MOD, the user can continually inform himself about the current status of his journey or of his ticket.

In order to record and possibly accordingly debit a journey or a number of journeys within a given time window, no longer is there any need for expensive active smart card readers in the stations S11 . . . S00; all that is required are the inexpensive passive data carriers T11 . . . T00 in the stations S11 . . . S00.

The "ticket purchase" and debiting operations take place in a quick, simple and convenient manner; there is no longer any need for passengers to go to ticket offices or to purchase tickets in a complicated manner from machines, and all that is required is the one-off conclusion of a corresponding contract with the system operator or possibly the loading of the mobile reader MOD with a "ticket" credit.

The mobile reader MOD, which is preferably an NFC reader, may be operated both "actively" as a reader (e.g. smart card reader) and "passively" as a data carrier (e.g. smart card, ISO14443 interface), so that the system VSY is backward-compatible with an already existing public transport infrastructure.

If active readers are already located in the stations S11 . . . S00, as forms part of the prior art, a user with his mobile reader MOD can likewise check into the system since the NFC interface of the mobile reader MOD of the user can also emulate a passive data carrier, which is why the system VSY is compatible with older systems.

Finally, it should also be pointed out that the features and advantages of the invention which have respectively been explained individually and in combination, may also arise in combination and individually, respectively.

The invention claimed is:

1. A method for obtaining tickets for journeys in a passenger transportation system which comprises stations for at least one of entering and leaving transport means of the system for journeys between the stations,
wherein at least one station of the system is assigned at least one passive contactlessly readable data carrier, the at least one passive contactlessly readable data carrier assigned to a station only stores a station-specific ticket information item which uniquely identifies the station;
wherein one of the at least one passive contactlessly readable data carrier assigned to the station is read by a mobile reader; and
wherein the corresponding ticket information item or items is/are stored in the mobile reader;
wherein a transport means of the system is assigned a passive contactlessly readable data carrier, wherein the passive contactlessly readable data carrier assigned to the transport means only stores a transport means-specific ticket information item which uniquely identifies the transport means, and wherein the passive contactlessly readable data carrier assigned to the transport means is read by the mobile reader.

2. A method as claimed in claim 1, wherein the ticket information item or items read by the mobile reader is/are used to calculate a fare.

3. A method as claimed in claim 2, wherein
a) in a departure station, a contactlessly readable data carrier assigned to said station is read and corresponding first ticket information items are stored in the mobile reader, and
b) in an arrival station, a contactlessly readable data carrier assigned to said station is read and corresponding second ticket information items are stored in the mobile reader, and
c) a fare for the journey is determined from the first and second ticket information items.

4. A method as claimed in claim 3, wherein, if no ticket information items of a contactlessly readable data carrier of an arrival station are available to determine the fare, a fixedly predefined fare is determined.

5. A method as claimed in claim 1, wherein determination of the fare from the ticket information items is carried out in the mobile reader.

6. A method as claimed in claim 1, wherein the ticket information items stored in the mobile reader are transmitted to a remote calculation server in order to determine the fare.

7. A method as claimed in claim 1, wherein the ticket information items are stored in a secure memory of the mobile reader.

8. A method as claimed in claim 1, wherein no information is transmitted between the at least one passive contactlessly readable data carrier assigned to the station and a background system for generating the station-specific ticket information item.

9. A passenger transportation system which comprises stations for at least one of entering and leaving transport means of the system for journeys between the stations, wherein at least one station of the system is assigned at least one contactlessly readable data carrier which contains at least one readable ticket information item, wherein no information is transmitted between the at least one contactlessly readable data carrier and a background system for generating the at least one ticket information item;
wherein a transport means is assigned a contactlessly readable data carrier, which only stores a transport means-specific ticket information item that uniquely identifies the transport means, and wherein no information is transmitted between the contactlessly readable data carrier assigned to the transport means and the background system for generating the transport means-specific ticket information item.

10. A system as claimed in claim 9, which comprises at least one calculation server for determining fares based on the ticket information items of the contactlessly readable data carriers which are transmitted from a mobile reader.

11. A system as claimed in claim 9, wherein access barriers which are coupled to the contactlessly readable data carriers are provided in the stations and an access barrier is opened to allow entering or leaving of the station only after a contactlessly readable data carrier has been read.

12. A calculation server for a system as claimed in claim 9, wherein the calculation server is designed to receive ticket information items of the contactlessly readable data carriers which are read by a mobile reader, and to determine fares on the basis of these ticket information items.

13. A system comprising:
a mobile reader comprising:
means for reading a ticket information item that is contained in passive contactlessly readable data carriers,
means for securely storing the ticket information item, and
means for determining a fare from the ticket information item or means for transmitting the stored ticket information item to a remote calculation server which determines a fare,
wherein at least one of the passive contactlessly readable data carriers is assigned to at least one station of a passenger transportation system, wherein at least one of the passive contactlessly readable data carriers is assigned to at least one transport means of the passenger transportation system, wherein the at least one passive contactlessly readable data carrier assigned to a station only stores station-specific ticket information items which uniquely identify the station, and wherein the at least one passive contactlessly readable data carrier assigned to a transport means only stores transport means-specific ticket information items which uniquely identify the transport means.

14. A system as claimed in claim 9, wherein each of the at least one contactlessly readable data carrier includes a near field communication device.

15. A system as claimed in claim 10, wherein each of the at least one contactlessly readable data carrier is configured to store a secret key to authenticate the contactlessly readable data carrier to the mobile reader, wherein the secret key is known only to an operator of the system.

16. A method as claimed in claim 1, wherein the ticket information items are collected into the mobile reader over a period of time and a fare for the journey is determined from the ticket information items collected into the mobile reader over the period of time, wherein the period of time is over 30 days.

17. A method as claimed in claim 1, wherein the contactlessly readable data carriers are fixed at easily accessible positions and at sites that are often frequented by passengers, and wherein the contactlessly readable data carriers are marked by corresponding posters or corresponding signs that indicate locations of the contactlessly readable data carriers.

* * * * *